United States Patent [19]

Chiou

[11] Patent Number: 5,564,802
[45] Date of Patent: Oct. 15, 1996

[54] DISKDRIVE CASE

[76] Inventor: Ming D. Chiou, 3F., No. 4, Alley 11, Lane 327, Sec. 2, Chung Shan Rd., Chung Ho City, Taipei, Taiwan

[21] Appl. No.: 528,232

[22] Filed: Sep. 14, 1995

[51] Int. Cl.$^6$ .............................. F16B 12/00; A47B 81/00
[52] U.S. Cl. .................... 312/111; 312/223.1; 312/223.2; 312/265.5; 312/265.6; 361/685; 439/660; 439/928; 206/503; 206/509
[58] Field of Search .................................. 312/111, 223.1, 312/223.2, 265.4, 265.5, 265.6; 361/683, 685, 725, 727, 733, 735; 206/503, 504, 509; 439/928, 660, 929, 39, 377, 344

[56] References Cited

U.S. PATENT DOCUMENTS

| | | | |
|---|---|---|---|
| 2,807,387 | 9/1957 | Siciliano | 312/111 X |
| 3,851,936 | 12/1974 | Muller | 312/111 X |
| 4,097,113 | 6/1978 | McKelvy | 439/377 X |
| 4,243,279 | 1/1981 | Ackeret | 312/111 X |
| 4,275,943 | 6/1981 | Gelardi et al. | 312/111 X |
| 4,401,351 | 8/1983 | Record | 361/735 X |
| 4,426,675 | 1/1984 | Robinson et al. | 206/509 X |
| 4,431,245 | 2/1984 | Jigamian et al. | 439/344 |
| 4,643,494 | 2/1987 | Marleau | 312/111 |
| 4,688,864 | 8/1987 | Sorel | 361/735 X |
| 4,767,003 | 8/1988 | Rice et al. | 206/509 X |
| 4,767,345 | 8/1988 | Gutter et al. | 439/660 X |
| 4,918,572 | 4/1990 | Tarver et al. | 439/928 X |
| 5,227,957 | 7/1993 | Deters | 312/223.2 X |
| 5,338,231 | 8/1994 | Wilhite | 439/660 |
| 5,403,203 | 4/1995 | Fischl et al. | 439/928 X |
| 5,431,570 | 7/1995 | Gibbs et al. | 439/39 |

*Primary Examiner*—José V. Chen
*Assistant Examiner*—Rodney B. White
*Attorney, Agent, or Firm*—Bacon & Thomas

[57] ABSTRACT

A diskdrive case including a top cover shell having two longitudinal sliding grooves and a rear opening, a bottom cover shell having two longitudinal sliding tracks and a rear opening, a first locating plate fastened to the rear opening of the top cover shell to hold a plurality of arched metal contact spring leaves, and a second locating plate fastened to the rear opening of the bottom cover shell to hold a plurality of curved metal contact spring leaves, wherein by engaging the longitudinal sliding tracks of one diskdrive case with the the longitudinal sliding grooves of another, a plurality of diskdrive cases can be connected in a stack; the arched contact metal spring leaves of one diskdrive case are respectively disposed in contact with the curved contact metal spring leaves of another when a plurality of diskdrive cases are connected in a stack.

1 Claim, 5 Drawing Sheets

DISKDRIVE CASE

BACKGROUND OF THE INVENTION

The present invention relates to a diskdrive case for mounting in the mainframe of a personal computer to hold a floppy diskdrive or CD-ROM, and relates more particularly to such a diskdrive case which is so designed that a plurality of diskdrive cases of the same structure can be conveniently connected in a stack, and the metal contact spring leaves of the diskdrive cases are automatically connected to the when they are arranged in a stack.

Personal computers have become more and more popular for doing a variety of jobs. A personal computer generally has a mounting frame defining a plurality of storage chambers for holding a plurality of floppy diskdrives and a CD-ROM. This arrangement wastes much installation space. Furthermore, when floppy diskdrives and a CD-ROM are installed in the storage chambers, they must be connected to the electric circuit of the personal computer by respective lead wires.

SUMMARY OF THE INVENTION

According to one aspect of the present invention, the diskdrive case is comprised of a top cover shell, a bottom cover shell, a front cover plate, and a rear cover plate, wherein the top cover shell has two longitudinal sliding grooves bilaterally disposed at the top side, the bottom cover shell has two longitudinal sliding tracks bilaterally disposed at the bottom side corresponding to the longitudinal sliding grooves of the top cover shell. Therefore, a plurality of diskdrive cases of the same structure can be conveniently connected in a stack by engaging the longitudinal sliding grooves of one diskdrive case with the longitudinal sliding tracks of another.

According to another aspect of the present invention, a first locating plate is fastened to a rear opening on the top cover shell to hold a plurality of arched metal contact spring leaves, and a second locating plate is fastened to a rear opening on the bottom cover shell to hold a plurality of curved metal contact spring leaves. Therefore, when a plurality of diskdrive cases are connected in a stack, the arched metal contact spring leaves of one diskdrive case are respectively disposed in contact with the curved metal contact spring leaves of another.

DETAILED DESCRIPTION OF THE PREFERRED EMBODIMENT

Figure 1:
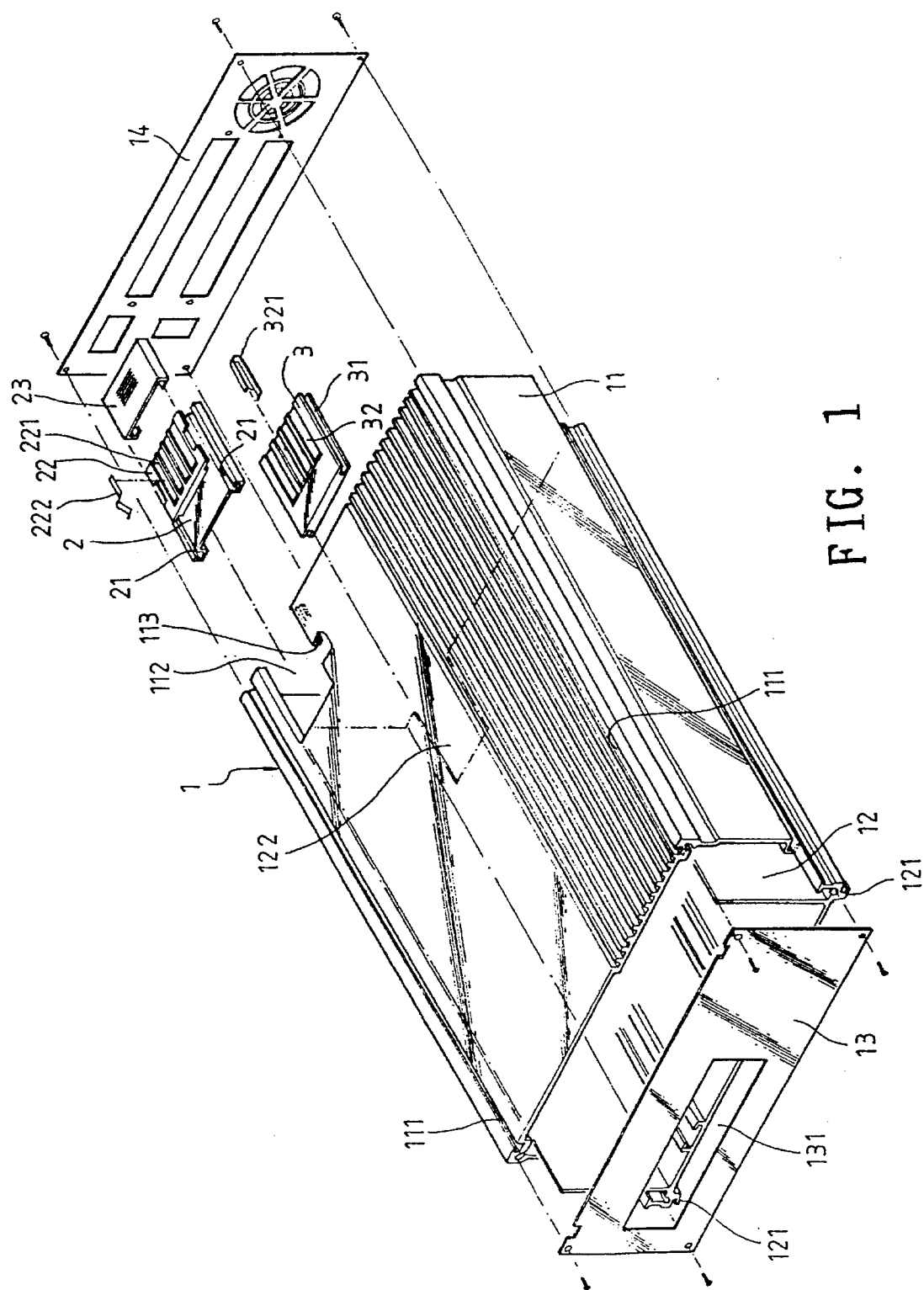
FIG. 1 is an exploded view of a diskdrive case according to the present invention.

Referring to FIG. 1, a diskdrive case in accordance with the present invention is generally comprised of a rectangular case body 1, which consists of an upper cover shell 11 and a bottom cover shell 12, a front cover plate 13, and a rear cover plate 14. The upper cover shell 11 and the bottom cover shell 12 are respectively made of substantially U-shaped cross section. The upper cover shell 11 has two longitudinal sliding grooves 111 bilaterally disposed at the top. The bottom cover shell 12 has two longitudinal sliding tracks 121 bilaterally disposed at the bottom. When the upper cover shell 11 is covered on the bottom cover shell 12, the front cover plate 13 is fixed to the upper cover shell 11 and the bottom cover shell 12 at the front side, and the rear cover plate 14 is fixed to the upper cover shell 11 and the bottom cover shell 12 at the rear side. The front cover plate 13 has a rectangular disk slot 131 through which a floppy disk or CD-ROM disk can be inserted into the diskdrive or CD-ROM inside the diskdrive case. The top cover shell 11 further comprises a rectangular opening 112 at the rear end near one longitudinal sliding groove 111, and two sliding rails 113 longitudinally disposed at two opposite sides of the rectangular opening 112. A locating plate 2 is fastened to the rectangular opening 112. The locating plate 2 comprises two sliding grooves 21 at two opposite sides respectively matched with the sliding rails 113, a flat spring holder 22 at the top side, a plurality of arched metal contact spring leaves 222 respectively mounted in respective grooves 221 on the flat spring holder 22, and a clamping plate 23 fastened to the flat spring holder 22 to hold down the metal contact spring leaves 222. The bottom cover shell 12 further comprises a rectangular opening 122 at the rear end corresponding to the rectangular opening 112 of the top cover shell 11 for mounting a locating plate 31. The locating plate 3 comprises two longitudinal sliding grooves 31 at two opposite sides engaged with two opposite lateral sides of the rectangular opening 122 of the bottom cover shell 12, a plurality of grooves 32 symmetrically disposed at the top and bottom sides, and a plurality of curved metal contact spring leaves 321 respectively clamped on the grooves 32.

Figure 2:
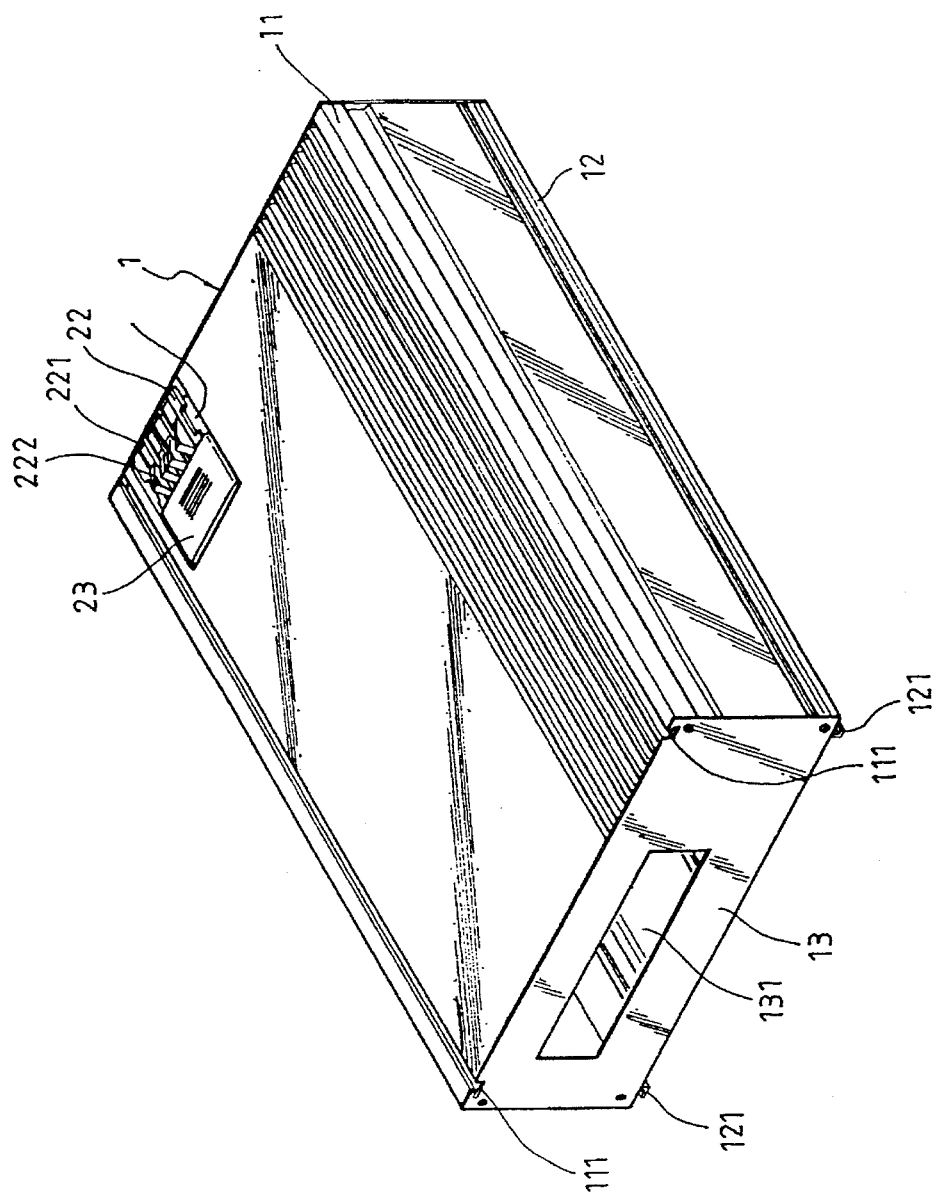
FIG. 2 is an elevational top view of the diskdrive case shown in FIG. 1.
Figure 3:
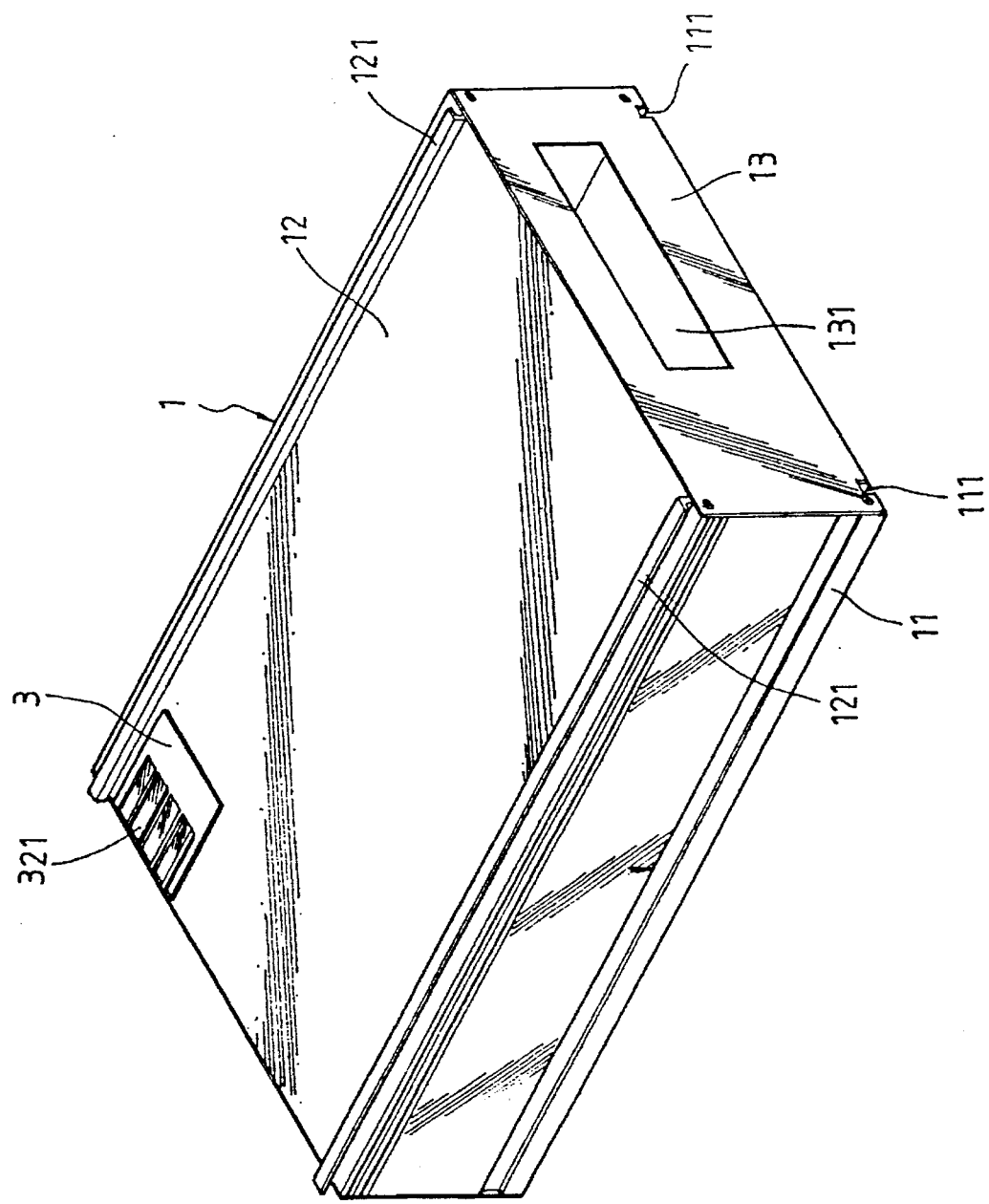
FIG. 3 is an elevational bottom view of the diskdrive case shown in FIG. 1.

Referring to FIGS. 2 and 3, when the diskdrive case is assembled, a diskdrive or CD-ROM can be mounted inside the diskdrive case, and a floppy disk or CD-ROM disk can be inserted into the diskdrive or CD-ROM inside the diskdrive case through the rectangular disk slot 131 of the front cover plate 13. When a diskdrive or CD-ROM is mounted inside the diskdrive case, the electric contact terminals of the diskdrive or CD-ROM are respectively connected to the arched contact metal spring leaves 222 and 321.

Figure 4:
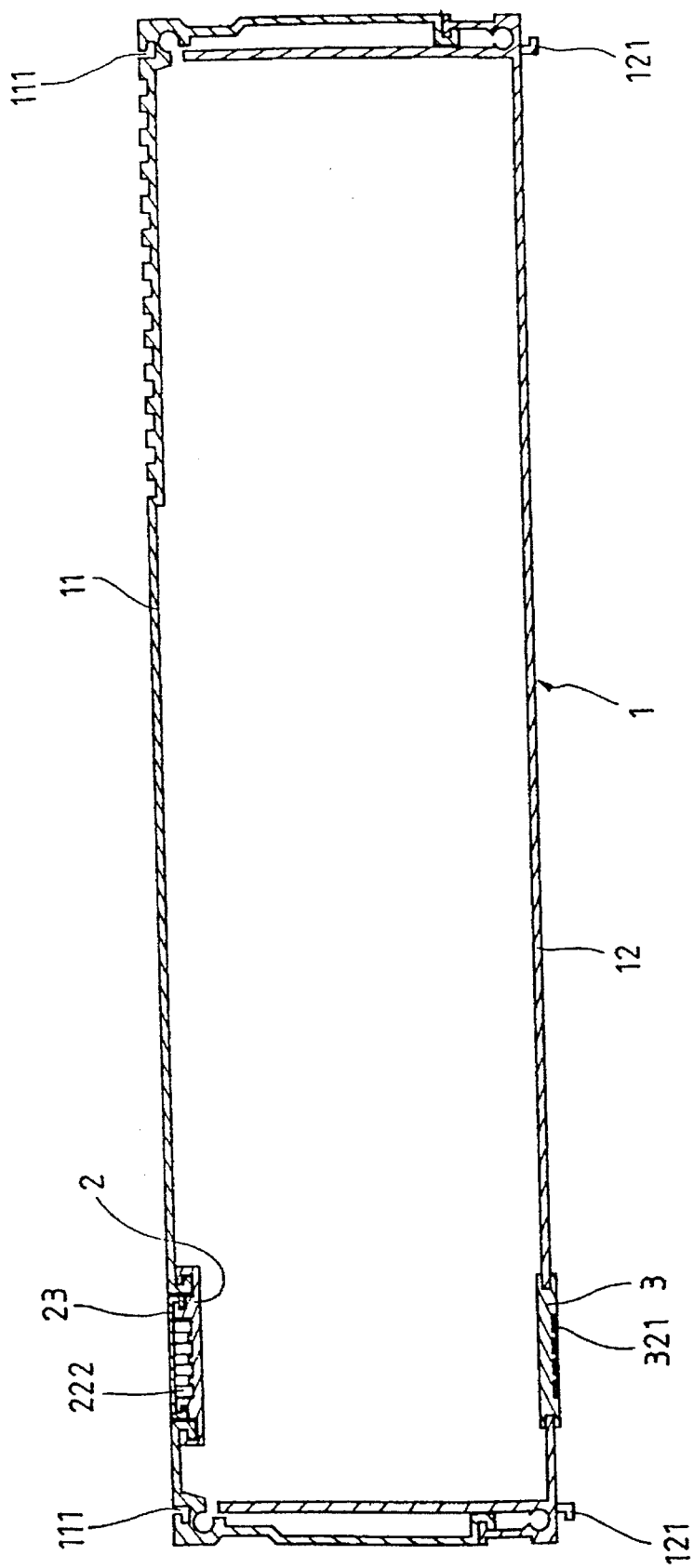
FIG. 4 is a sectional side view of the diskdrive case shown in FIG. 1.

Referring to FIG. 4, the locating plates 2 and 3 are respectively fastened to the top cover shell 11 and the bottom cover shell 12, and the longitudinal sliding grooves 111 of the top cover shell 11 are respectively aligned with the longitudinal sliding tracks 121 of the bottom cover shell 12.

Figure 5:
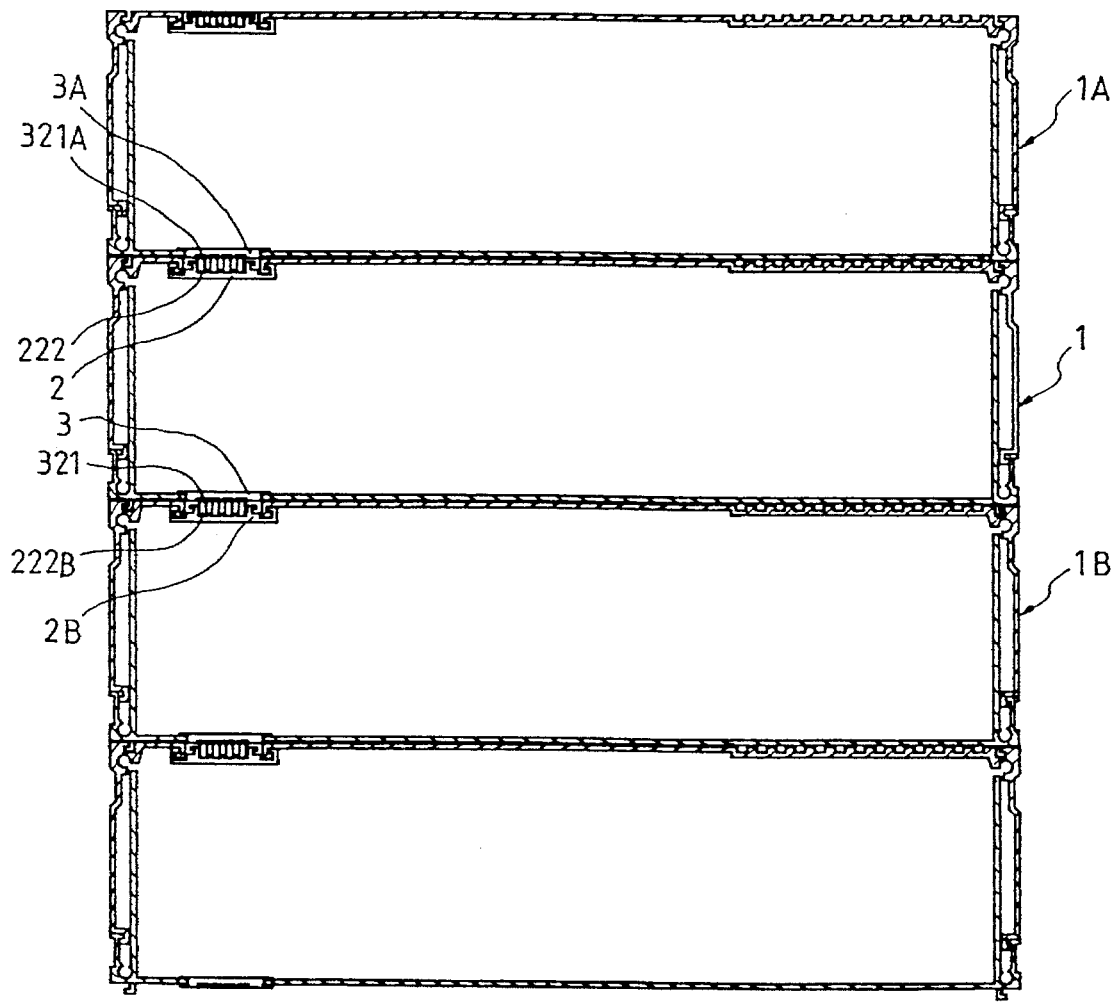
FIG. 5 is a sectional view showing a plurality of diskdrive cases connected in a stack according to the present invention.

Referring to FIG. 5, by engaging the longitudinal sliding tracks 121 of one diskdrive case with the the longitudinal sliding grooves 111 of another, a plurality of diskdrive cases are connected in a stack. When a plurality of diskdrive cases are connected in a stack, the arched contact metal spring leaves 222 and curved contact metal spring leaves 321 of the case body 1 are respectively disposed in contact with the curved contact metal spring leaves 321A on the locating plate 3A of the case body 1A above and the contact metal spring leaves 222A on the locating plate 2B of the case body 1B below. Therefore, no additional electric wiring is needed.

It is to be understood that the drawings are designed for purposes of illustration only, and are not intended as a definition of the limits and scope of the invention disclosed.

I claim:

1. A diskdrive case comprising:

a rectangular case body for holding a floppy diskdrive or CD-ROM, said case body comprised of a top cover shell, a bottom cover shell, a front cover plate, and a rear cover plate, said top cover shell comprising two longitudinal sliding grooves bilaterally disposed at a top side thereof, a rectangular opening at a rear side thereof adjacent to one longitudinal sliding groove, and two sliding rails at two opposite sides of the rectangular opening of said top cover shell, said bottom cover shell comprising two longitudinal sliding tracks bilaterally disposed at a bottom side thereof corresponding to the longitudinal sliding grooves of said top cover shell, and a rectangular opening at a rear side thereof corresponding to the rectangular opening of said top cover shell;

a first locating plate fastened to the rectangular opening of said top cover shell, said first locating plate comprising two sliding grooves at two opposite sides respectively engaged with the two sliding rails of the rectangular opening of said top cover shell, a flat spring holder at a top side thereof, a plurality of arched metal contact spring leaves respectively mounted in respective grooves on said flat spring holder, and a clamping plate fastened to said flat spring holder to hold down said arched metal contact spring leaves; and a second locating plate fastened to the rectangular opening of said bottom cover shell, said second locating plate comprising two longitudinal sliding grooves at two opposite sides engaged with two opposite lateral sides of the rectangular opening of said bottom cover shell, a plurality of grooves symmetrically disposed on top and bottom sides thereof, and a plurality of curved metal contact spring leaves respectively clamped on the grooves of the locating plate of said bottom cover shell;

wherein by engaging the longitudinal sliding tracks of one diskdrive case with the longitudinal sliding grooves of another, a plurality of diskdrive cases can be connected in a stack; the arched contact metal spring leaves of one diskdrive case are respectively disposed in contact with the curved contact metal spring leaves of another when a plurality of diskdrive cases are connected in a stack.

* * * * *